(12) United States Patent
Bao et al.

(10) Patent No.: US 8,782,188 B2
(45) Date of Patent: Jul. 15, 2014

(54) AUTOMATED DEVICE REPORTING

(75) Inventors: Derek Hongwei H. Bao, Concord, CA (US); Vikram Rawat, San Ramon, CA (US); Patricia Ruey-Jane Chang, San Ramon, CA (US); Steven R. Rados, Danville, CA (US); Maria G. Lam, Oakland, CA (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 488 days.

(21) Appl. No.: 12/827,671

(22) Filed: Jun. 30, 2010

(65) Prior Publication Data

US 2012/0005177 A1 Jan. 5, 2012

(51) Int. Cl.
*G06F 15/17* (2006.01)
*H04L 12/26* (2006.01)

(52) U.S. Cl.
CPC .................................. *H04L 43/0829* (2013.01)
USPC ........................................................ 709/223

(58) Field of Classification Search
CPC .................................................. H04L 43/0829
USPC .......... 370/244, 252; 709/255, 256, 408, 413, 709/351, 230, 204, 223, 224, 232, 238
See application file for complete search history.

(56) References Cited

U.S. PATENT DOCUMENTS

| | | | | |
|---|---|---|---|---|
| 7,385,931 | B2 * | 6/2008 | Magnaghi et al. | 370/248 |
| 7,519,372 | B2 * | 4/2009 | MacDonald et al. | 455/456.1 |
| 2004/0077331 | A1 * | 4/2004 | King | 455/405 |
| 2004/0152471 | A1 * | 8/2004 | MacDonald et al. | 455/456.1 |
| 2004/0236850 | A1 * | 11/2004 | Krumm et al. | 709/224 |
| 2006/0007870 | A1 * | 1/2006 | Roskowski et al. | 370/252 |
| 2006/0007901 | A1 * | 1/2006 | Roskowski et al. | 370/338 |
| 2007/0022320 | A1 * | 1/2007 | Flocken et al. | 714/37 |
| 2008/0008097 | A1 * | 1/2008 | Avadhanam | 370/235 |
| 2009/0002754 | A1 * | 1/2009 | Kim et al. | 358/1.15 |
| 2009/0005119 | A1 * | 1/2009 | Patel et al. | 455/562.1 |
| 2009/0221299 | A1 * | 9/2009 | MacDonald et al. | 455/456.1 |

* cited by examiner

*Primary Examiner* — Cheyne D Ly

(57) ABSTRACT

A method performed by a device includes detecting a first condition to generate a report record associated with the device; generating the report record associated with the device, in response to detecting the first condition, where generating the report record includes recording environment conditions associated with the device, recording device conditions associated with the device, and recording signal conditions associated with the device; detecting a second condition to send the generated report record to a server device; and sending the generated report record to the server device, in response to detecting the second condition.

16 Claims, 9 Drawing Sheets

AUTOMATED DEVICE REPORTING

BACKGROUND INFORMATION

Wireless communication networks continue to increase in popularity, leading to increasing numbers of user devices connected to wireless communication networks. User devices, such as mobile communication devices, may be employed by users to communicate with other users or to access services available via a network. Network providers may desire to optimize network performance and maximize user satisfaction. However, a network provider may not be able to determine whether a user's experience is satisfactory without direct input from the user. Furthermore, a wireless communication network servicing a large number of user devices may find it quite challenging to monitor user device performance.

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

Implementations described herein may relate to automated user device reporting. A user device may detect a condition to collect data associated with the user device, recording data associated with the user device, detecting a condition to send the recorded data to a server device, and sending the recorded data to the server device.

Data may be collected, for example, at particular intervals, in response to a trigger event, and/or based on receiving a request from a server device associated with a device report managing system. Trigger events to collect data may include, for example, a dropped call or interruption in service; activation of a particular function associated with the user device; a particular parameter associated with the user device reaching a particular threshold; a malfunction associated with hardware and/or software associated with the user device; or detecting that the user device is located in a particular location.

Data that may be recorded may include, for example, data associated with the environment of the user device, such as a time at which the data was recorded, the location associated with the user device, and/or neighboring network sites associated with the user device (e.g., base stations). Data that may be recorded may further include data associated with the user device, such as, for example, hardware associated with the user device, software associated with the user device, network settings associated with the user device, usage conditions of the user device, and/or a last communication associated with the user device.

Collected data may be sent to a server device associated with a device report managing system, for example, at particular intervals, in response to a trigger event, and/or based on receiving a request from the server device. Trigger events to send collected data may include, for example, a dropped call or interruption in service; activation of a particular function associated with the user device; a particular parameter associated with the user device reaching a particular threshold over a particular interval; or a malfunction associated with hardware and/or software associated with the user device.

Furthermore, an implementation described herein may relate to gathering user device data from multiple user devices and generating a statistics report based on the gathered user device data. Moreover, an implementation described herein may relate to receiving user device data from a particular user device data, analyzing the received user device data, determining new device settings based on the analyzed user device data, and providing the new device settings to the user device.

Figure 1:
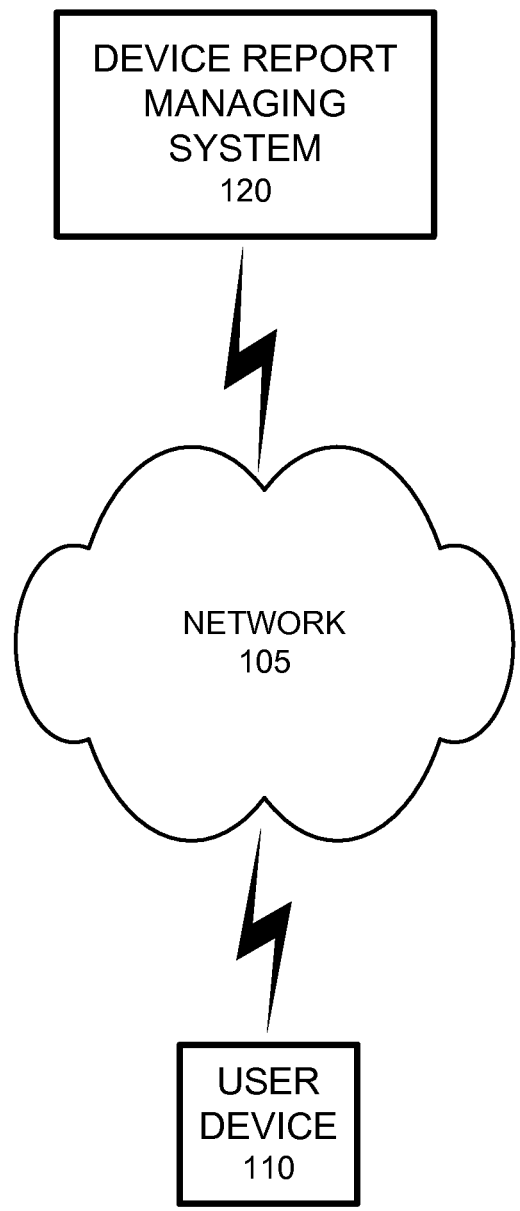
FIG. 1 is a diagram illustrating example components of a system according to an implementation described herein.

FIG. 1 is a diagram of example components of system 100 according to an implementation described herein. As shown in FIG. 1, system 100 may include a network 105, a user device 110, and a device report managing system 120.

Network 105 may include a circuit-switched network or a packet-switched network. For example, network 130 may include one or more of a local area network (LAN), a wide area network (WAN), a metropolitan area network (MAN), a wireless network, such as a general packet radio service (GPRS) network, an ad hoc network, a public switched telephone network (PSTN), a subset of the Internet, any other network, or any combination thereof.

User device 110 may include any communication device that a user may use to communicate with device report managing system 120. For example, user device 110 may include a mobile communication device, such as a mobile phone, a personal digital assistant (PDA), or a media playing device with communication capabilities; a desktop device, such as a personal computer or a workstation; a laptop computer; a telephone terminal; or any other communication device or combinations thereof. User device 110 may connect to network 105 via a wired or a wireless connection.

In one implementation, user device 110 may be associated with a particular user (e.g., user device 110 may include a mobile phone). In another implementation, user device 110 may not be associated with a particular user. For example, user device 110 may include a service device that communicates with network 105 without user interaction, such as a telemetry device, a device dedicated for data collection, or a device that relays signals to and from a device associated with a particular user (e.g., a mobile phone). In yet another implementation, user device 110 may include both a user device associated with a particular user and a service device.

Device report managing system 120 may include one or more devices capable of performing the functions of a device reporting system as described herein. For example, device report managing system 120 may include one or more server devices.

Although FIG. 1 shows example components of system 100, in other implementations, system 100 may include fewer components, different components, differently arranged components, or additional components than depicted in FIG. 1. Additionally or alternatively, one or more components of system 100 may perform the tasks described as being performed by one or more other components of system 100.

Figure 2:
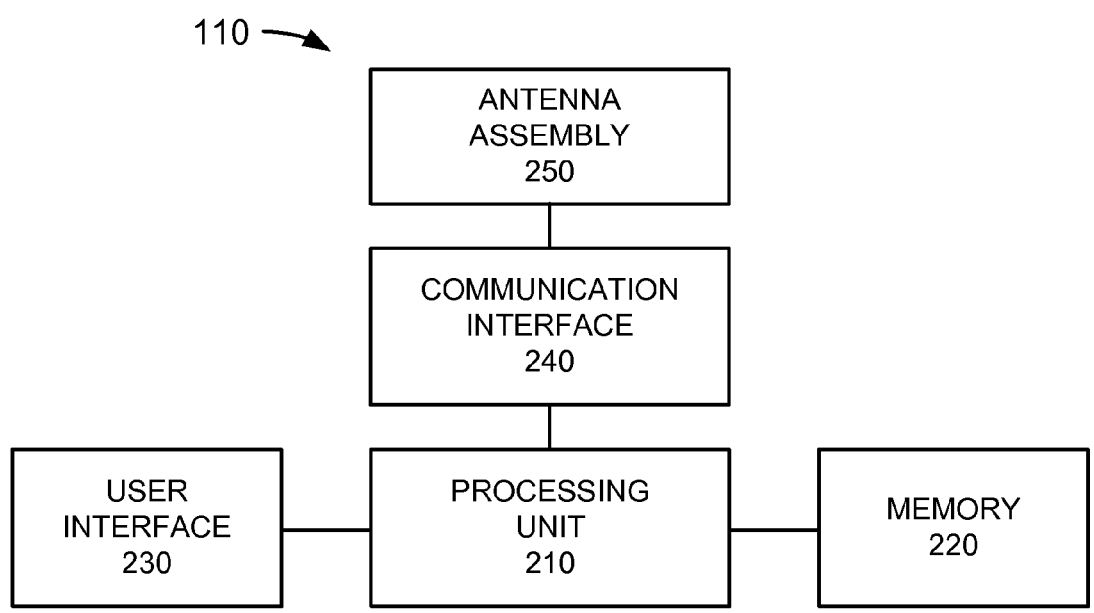
FIG. 2 is a diagram illustrating example components of a device report managing system according to an implementation described herein.

FIG. 2 illustrates a diagram of example components of user device 110. As shown in FIG. 2, user device 110 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), or the like. Processing unit 210 may control operation of user device 110 and its components.

Memory 220 may include a random access memory (RAM) device or another type of dynamic storage device that may store information and instructions for execution by processing unit 210, a read only memory (ROM) device or another type of static storage device that may store static information and instructions for use by processing unit 210, a magnetic and/or optical recording memory device and its corresponding drive, and/or a removable form of memory, such as a flash memory.

User interface 230 may include mechanisms for inputting information to user device 110 and/or for outputting information from user device 110. Examples of input and output mechanisms might include a speaker to receive electrical signals and output audio signals; a camera lens to receive image and/or video signals and output electrical signals; a microphone to receive audio signals and output electrical signals; buttons to permit data and control commands to be input into user device 110; a display to output visual information; and/or a vibrator to cause user device 110 to vibrate.

Communication interface 240 may include any transceiver-like mechanism that enables user device 110 to communicate with other devices and/or systems. For example, communication interface 240 may include a modem or an Ethernet interface to a local area network (LAN). Communication interface 240 may also include mechanisms for communicating via a network, such as a wireless network. For example, communication interface 240 may include, for example, a transmitter that may convert baseband signals from processing unit 210 to radio frequency (RF) signals and/or a receiver that may convert RF signals to baseband signals. Alternatively, communication interface 340 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 350 may, for example, receive RF signals from communication interface 240 and transmit the RF signals over the air and receive RF signals over the air and provide the RF signals to communication interface 240. In one implementation, for example, communication interface 240 may communicate with a network (e.g., a local area network (LAN), a wide area network (WAN), a telephone network, such as the Public Switched Telephone Network (PSTN), an intranet, the Internet, or a combination of networks).

As described herein, user device 110 may perform certain operations in response to processing unit 210 executing software instructions contained in a computer-readable medium, such as memory 220. A computer-readable medium may be defined as a physical or logical memory device. A logical memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of user device 110, in other implementations, user device 110 may include fewer components, different components, differently arranged components, or additional components than depicted in FIG. 2. Additionally or alternatively, one or more components of user device 110 may perform the tasks described as being performed by one or more other components of user device 110.

Figure 3:
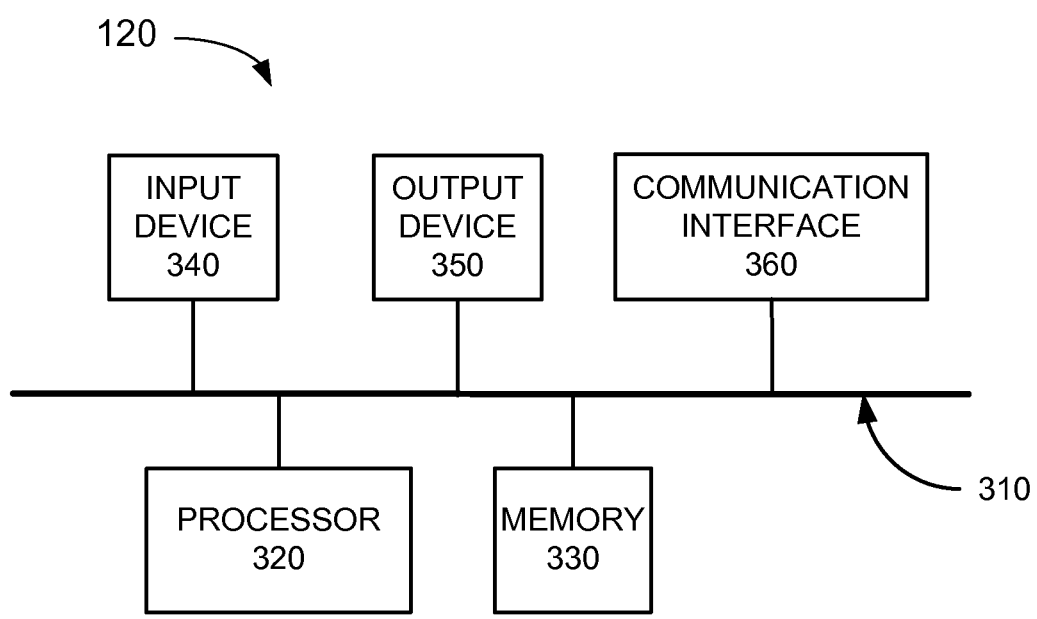
FIG. 3 is a diagram illustrating example components of a server device according to an implementation described herein.

FIG. 3 is a diagram illustrating example components of device report managing system 120 according to an implementation described herein. As shown, device report managing system 120 may include a bus 310, a processor 320, a memory 330, an input device 340, an output device 350, and a communication interface 360.

Bus 310 may include a path that permits communication among the components of device report managing system 120. Processor 320 may include one or more processors, microprocessors, or processing logic (e.g., ASICs or FPGAs) that may interpret and execute instructions. Memory 330 may include a RAM device or another type of dynamic storage device that may store information and instructions for execution by processor 320, a ROM device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to the device, such as a keyboard, a mouse, a button, a pen, a touch screen, voice recognition and/or biometric mechanisms, etc. Output device 350 may include a mechanism that outputs information to the operator, including a display, a light emitting diode (LED), a speaker, etc. Communication interface 360 may include any transceiver-like mechanism that enables the device to communicate with other devices and/or systems. For example, communication interface 360 may include a modem, a network interface card, or a wireless interface card.

As will be described in detail below, device report managing system 120 may perform certain operations. Device report managing system 120 may perform these operations in response to processor 320 executing software instructions contained in a computer-readable medium, such as memory 330.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of device report managing system 120, in other implementations, device report managing system 120 may include fewer components, different components, additional components, or differently arranged components than depicted in FIG. 3. Additionally or alternatively, one or more components of device report managing system 120 may perform one or more tasks described as being performed by one or more other components of the device.

Figure 4A:
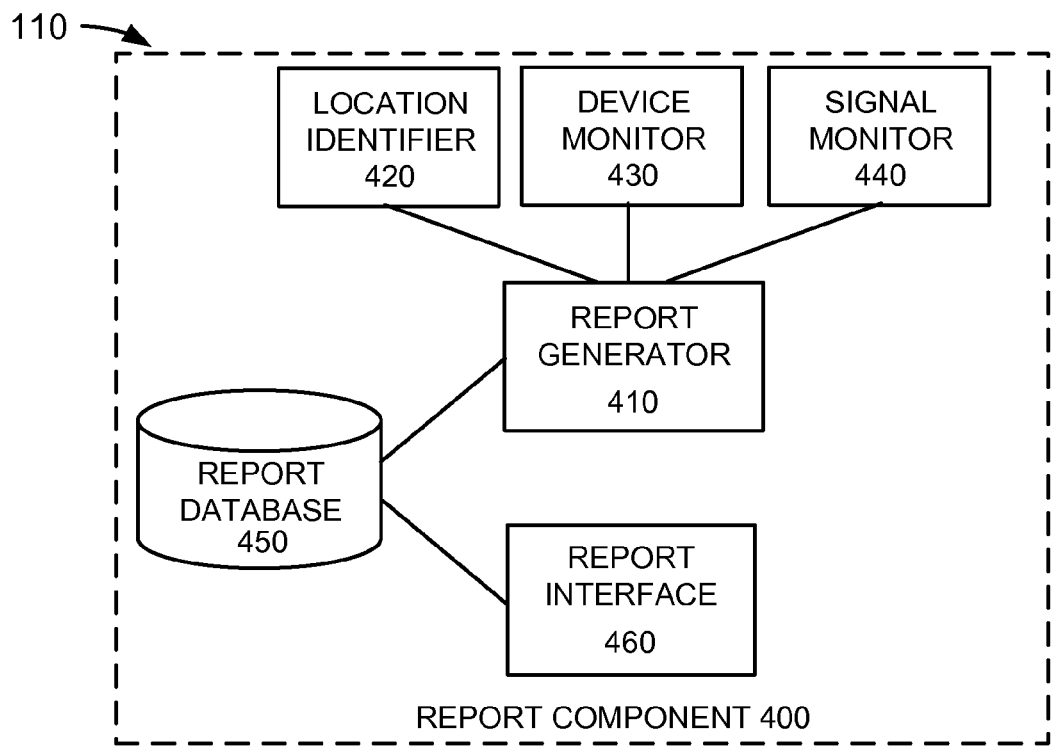
FIG. 4A is a diagram illustrating example functional components of a user device according to an implementation described herein.

FIG. 4A is a diagram illustrating example functional components of user device 110 according to an implementation described herein. As shown in FIG. 4A, user device 110 may include a report component 400. In one implementation, report component 400 may be installed in user device 110 during manufacture. For example, report component 400 may be included as part of a Universal Integrated Circuit Car (UICC) of user device 110. In another implementation, report component 400 may be installed in user device 110 during registration of user device 110 with network 105. In yet another implementation, report component 400 may be installed in user device 110 at a later time, after user device 110 has registered with network 105. A user of user device 110 may be prompted to give permission to install report component 400 in user device 110 prior to installation. Report component 400 may include a report generator 410, a location identifier 420, a device monitor 430, a signal monitor 440, a report database 450, and a report interface 460. Report component 400 may be implemented in one or more of the components illustrated in FIG. 2.

Report generator 410 may gather information associated with user device 110, the environment of user device 110, and/or signals associated with user device 110 and generate a device report based on the gathered information. Report generator 410 may detect a particular condition that may cause report generator 410 to generate a device report. For example, report generator 410 may generate reports at particular intervals, in response to detecting a trigger event, or in response to receiving a request from device report managing system 120. Report generator 410 may generate the device report based on information obtained from location identifier 420, device monitor 430, and/or signal monitor 440.

Location identifier 420 may identify a location associated with user device 110. The location of user device 110 may be determined based on, for example, a Global Positioning System (GPS) receiver included in user device 110, cell identification, information obtained from multiple base stations based on a multilateration process, information inputted by a user of user device 110, and/or based on any other method of obtaining location information.

Device monitor 430 may monitor the status of parameters associated with user device 110. For example, device monitor 430 may monitor the status of particular hardware indicators, such as interrupts associated with particular integrated circuits (ICs) included in user device 110, which may indicate a hardware malfunction; may monitor the status of particular software indicators, such as alarms or error signals associated with particular processes running on user device 110; may monitor usage conditions associated with user device 110, such as memory use, the number of running processes, processor performance, or processor time associated with particular processes; may monitor types of communications performed by user device 110; and/or may monitor other information associated with usage conditions of user device 110.

Signal monitor 440 may monitor the status of signals exchanged between user device 110 and network 105. For example, signal monitor 440 may monitor a signal strength of particular signals; a noise level of particular signals; a bit rate of particular signals; an error rate of particular signals; a modulation scheme associated with particular signals; and/or may monitor other information associated with signals exchanged between user device 110 and network 105.

Report database 450 may store report records generated by report generator 410. Example fields that may be stored in report database 450 are described below with reference to FIG. 5. Report interface 460 may provide device reports to device report managing system 120. For example, report interface 460 may detect a particular condition that may cause report interface 460 to send a report to device report managing system 120. For example, report interface 460 may send a report at particular intervals, may send a report in response to detecting a trigger event, and/or may send a report in response to receiving a request for reports from device report managing system 120. Furthermore, report interface 460 may select which information from report records is to be provided to device report managing system 120 and may prepare the information into a particular format compatible with device report managing system 120.

Although FIG. 4A shows example functional components of user device 110, in other implementations, user device 110 may include fewer functional components, different functional components, differently arranged functional components, or additional functional components than depicted in FIG. 4A. Additionally or alternatively, one or more functional components of user device 110 may perform one or more tasks described as being performed by one or more other functional components of user device 110.

Figure 4B:
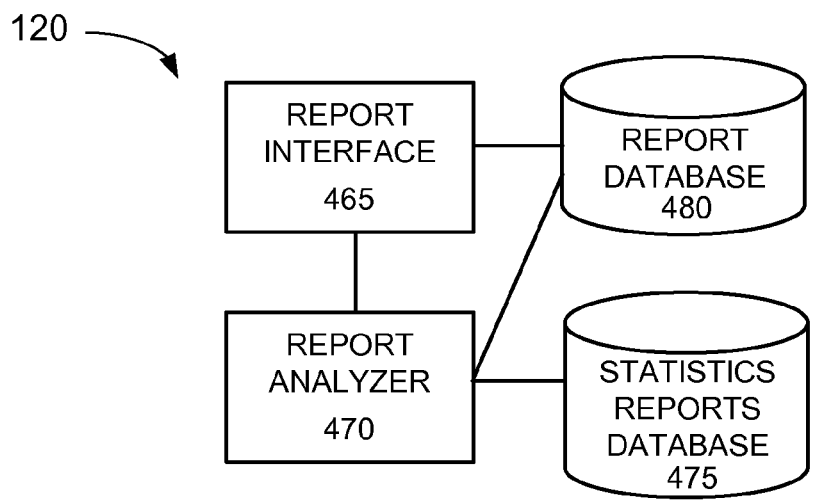
FIG. 4B is a diagram illustrating example functional components of a device report managing system according to an implementation described herein.

FIG. 4B is a diagram illustrating example functional components of device report managing system 120 according to an implementation described herein. As shown in FIG. 4B, device reporting system 420 may include a report interface 465, a report analyzer 470, a statistics reports database 475, and a report database 480. The functional components illustrated in FIG. 4B may be implemented via one or more of the components of FIG. 3.

Report interface 465 may receive indications of problems associated with user device 110 and may request particular information associated with report records stored in user device 110. Furthermore, report interface 465 may request user device 110 to generate a particular report record that includes information required by device report managing system 120. Report interface 465 may receive information, associated with report records, from user device 110. Report interface 465 may store the received information in report database 480.

Report analyzer 470 may access report records stored in report database 480 and analyze the information stored in the report records. For example, report analyzer 470 may access one or more report records associated with a particular user device and determine new settings for the particular user device to improve performance and/or address a particular problem reported by the particular user device. As another example, report analyzer 470 may access report records associated with different user devices and generate a statistics report that illustrates how one or more first parameters, associated with the user devices, varies with respect to one or more second parameters, associated with the user devices. For example, report analyzer 470 may generate a report that indicates how often calls are dropped at a particular location, average signal strength at a particular location for a particular modulation scheme, average bit rates associated with a particular network setting on a user device with a particular hardware configuration, etc. Statistics reports database 475 may store statistics reports generated by report analyzer 470.

Report database 480 may store information, associated with report records, that was received from user device 110. In one implementation, report database 480 may store report records substantially identical to report records stored in report database 450 of user device 110. In another implementation, report database 480 may store report records with fewer fields, additional fields, different fields, or differently arranged fields than the fields included in report records stored in report database 450.

Although FIG. 4B shows example functional components of device report managing system 120, in other implementations, device report managing system 120 may include fewer functional components, different functional components, differently arranged functional components, or additional functional components than depicted in FIG. 4B. Additionally or alternatively, one or more functional components of device report managing system 120 may perform one or more tasks described as being performed by one or more other functional components of device report managing system 120.

Figure 5:
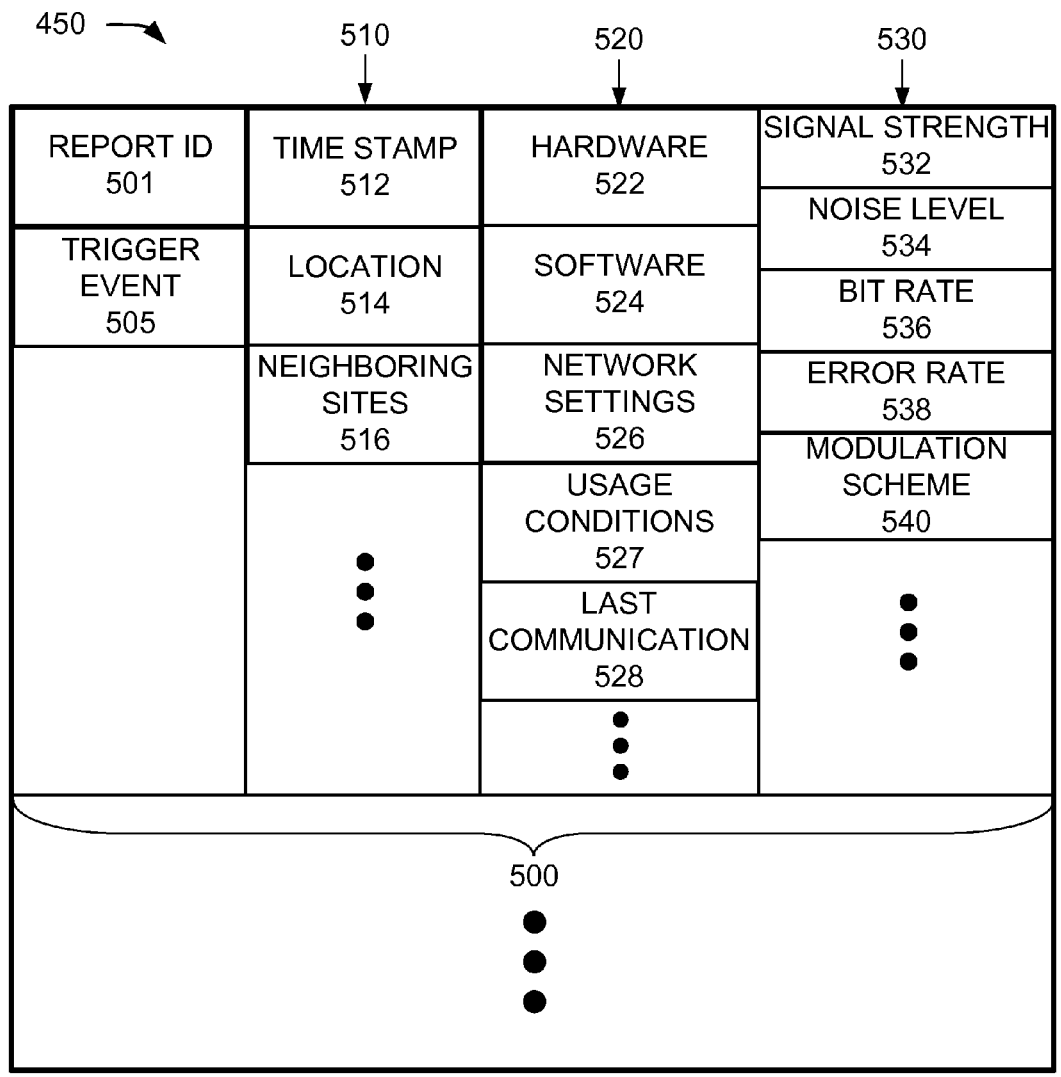
FIG. 5 is a diagram of example fields that may be stored within a report database according to an implementation described herein.

FIG. 5 is a diagram of example fields that may be stored within report database 450 (and/or within report database 480) according to an implementation described herein. In one implementation, report database 450 may be implemented in a storage device included as part of memory 220 of user device 110 (and report database 480 may be implemented in a storage device included as part of memory 330 of device report managing system 120). In another implementation, report database 450 may be stored in a memory associated with another device or a group of devices, separate from or including memory 220 of user device 110 (report database 480 may be stored in a memory associated with another device or a group of devices, separate from or including memory 330 of device report managing system 120).

As shown in FIG. 5, report database 450 (and/or report database 480) may store report records 500 (referred to herein collectively as "report records 500" and individually as "report record 500"). Report record 500 may include a report identification (ID) field 501, a trigger event field 505, an environment data field 510, a device data field 520, and a signal data field 530.

Report ID field 501 may store information that identifies a particular report record 500. In one implementation, report ID field 501 may store information identifying a particular user device. In another implementation, to preserve privacy, report ID field 501 may not include any information identifying a particular user device. Trigger event field 505 may store information identifying a type of trigger event that causes report record 500 to be generated. For example, trigger event field 505 may identify that report record 500 was generated as a result of a dropped call, as a result of a bit rate falling below a particular threshold, as a result of a signal strength falling below a particular threshold, as a result of an error rate rising above a particular threshold, or as a result of a request to generate a report received from device report managing system 120.

Environment data field 510 may include one or more fields that store information associated with the environment and/or network conditions associated with user device 110 when report record 500 is generated, and/or temporal and/or spatial information associated with the particular report record 500. For example, environment data field 510 may include a time stamp field 512, a location field 514, and a neighboring sites field 516.

Time stamp field 512 may store a time and/or date at which report record 500 was generated. Location field 514 may store information identifying a geographic location at which user device 110 was located when report record 500 was generated. The information may identify a particular cell site associated with a base station; may be in the form of a geographic code, such as a longitude and latitude code, or a hierarchical grid code; may be in the form of an address, such a particular block of a particular street; or may be in any other form of specifying a geographic location.

Neighboring sites field 516 may store information about neighboring network sites associated with network 105. For example, neighboring sites field 516 may store information identifying a particular number of the closest base stations. Neighboring sites field 516 may store information identifying sites associated with a same network, associated with a different network, or a combination thereof. For example, if network 105 includes a Long Term Evolution (LTE) network, neighboring sites field 516 may store information identifying neighboring LTE base stations, and/or information identifying neighboring base stations associated with a different network, such as a Global System for Mobile Communications (GSM) network, and/or a Code Division Multiple Access (CDMA) network.

Device data field 520 may include one or more fields that store information associated with user device 110 when report record 500 is generated. For example, device data field 520 may include a hardware field 522, a software field 524, a network settings field 526, a usage conditions field 527, and a last communication field 528.

Hardware field 522 may store information identifying particular hardware associated with user device 110. For example, hardware field 522 may store information identifying a make and/or model of user device 110, may store information identifying particular ICs included in user device 110, and/or may store information identifying particular firmware installed in user device 110. Additionally or alternatively, hardware field 522 may store particular hardware settings present on user device 110 when report record 500 was generated.

Software field 524 may store information identifying particular software associated with user device 110. For example, software field 524 may store information identifying a particular operating system of user device 110 and/or applications installed on user device 110. Additionally or alternatively, software field 524 may store particular software settings present on user device 110 when report record 500 was generated.

Network settings field 526 may store information identifying a particular configuration of user device 110 in connection with network 105. For example, network settings field 526 may store information identifying a particular base station associated with user device 110, configurations associated with a control plane protocol between user device 110 and a base station, a modulation scheme for transmitting signals from user device 110 to network 105, and/or configurations associated with a signal plane protocol between user device 110 and a base station.

Usage conditions field 527 may store information associated with usage conditions of user device 110 when report record 500 was generated. For example, usage conditions field 527 may store an amount of memory being used by processes running on user device 110, an amount of processor time associated with particular processes, and/or a performance associated with a processor of user device 110.

Last communication field 528 may store information about a last communication performed by user device 110. For example, last communication field 528 may store a type of last communication (e.g., voice, multimedia, or data), a duration of the last communication, an average bit rate associated with the last communication, a location associated with the last communication, and/or whether the last communication was interrupted.

Signal data field 530 may include one or more fields that include information associated with signals exchanged between user device 110 and network 105. For example, signal data field 530 may include a signal strength field 532, a noise level field 534, a bit rate field 536, an error rate field 538, and a modulation scheme field 540.

Signal strength field 532 may store information about a maximum signal strength, a minimum signal strength, and/or an average signal strength associated with a current, or a previous, signal received by user device 110 from network 105. Noise level field 534 may store information about a maximum noise level, a minimum noise level, and/or an average noise level associated with a current, or a previous, signal received by user device 110 from network 105. Bit rate field 536 may store information about a maximum bit rate, a minimum bit rate, and/or an average bit rate associated with a current, or previous, signal received by user device 110 from network 105. Error rate field 538 may store information about a maximum error rate, a minimum error rate, and/or an average error rate associated with a current, or a previous, signal received by user device 110 from network 105. The error rate may be associated with, for example, a packet loss rate. Modulation scheme field 540 may store information about a particular modulation scheme associated with a current, or a previous, signal received by user device 110 from network 105.

Although FIG. 5 shows example fields of report database 450 (and/or report database 480), in other implementations, report database 450 (and/or report database 480) may include fewer fields, different fields, additional fields, or differently arranged fields than depicted in FIG. 5. Additionally or alternatively, one or more fields of report database 450 (and/or report database 480) may include information described as being stored in one or more other fields of report database 450 (and/or report database 480).

Figure 6A:
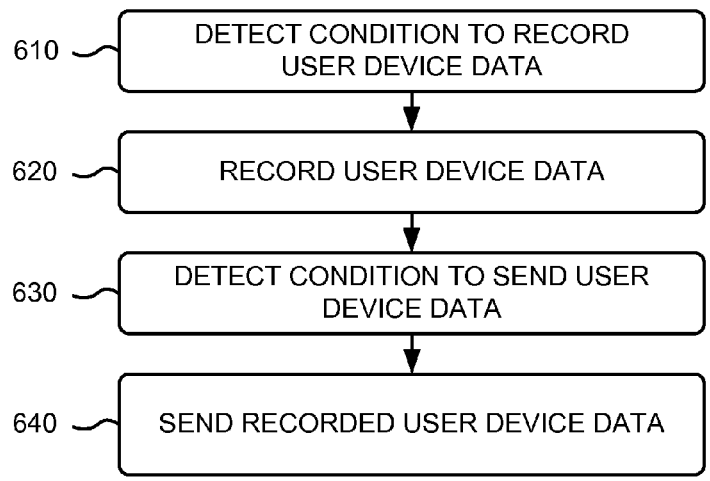
FIG. 6A is a flow diagram illustrating a first process for recording and reporting data by a user device according to an implementation described herein.

FIG. 6A is a flow diagram illustrating a first process for recording and reporting data by user device 110 according to an implementation described herein. In one implementation, the process of FIG. 6A may be performed by user device 110. In other implementations, some or all of the process of FIG. 6A may be performed by another device or a group of devices separate from or including user device 110.

The process of FIG. 6A may include detecting a condition to record user device data (block 610). For example, report generator 410 may detect a particular condition that has been designated as causing report generator 410 to generate report record 500.

Figure 6B:
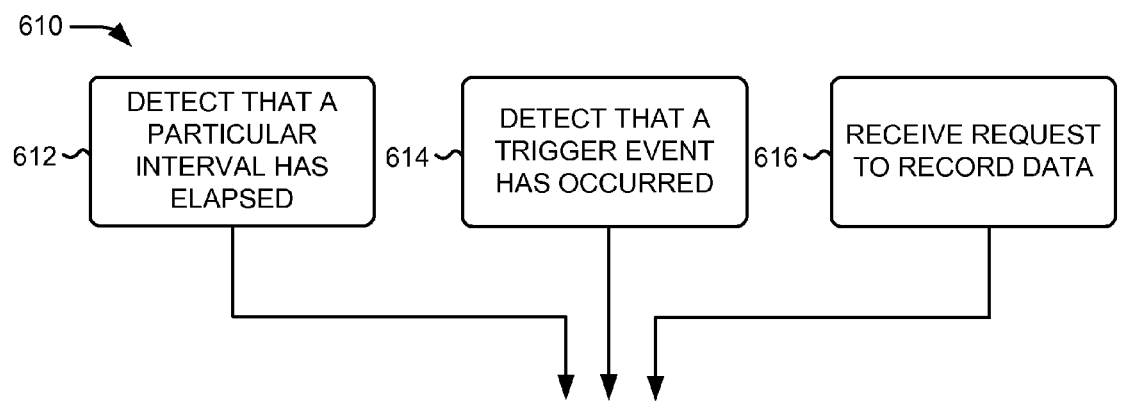
FIG. 6B is a first flow diagram illustrating in more detail part of the process of FIG. 6A according to an implementation described herein.

FIG. 6B illustrates in more detail part of the process of FIG. 6A represented by block 610. Detecting a condition to record user device data may include detecting that a particular interval has elapsed (block 612). For example, report generator 410 may be configured to generate report record 500 at particular intervals. In one implementation, the particular intervals may be determined by report component 400. In another implementation, the particular intervals may be determined by device report managing system 120. For example, device report managing system 120 may request that user device 110 provide a streaming report during a diagnosis procedure. The streaming report may continue as user device 110 changes locations or changes parameters associated with user device 110 or associated with a signal between user device 110 and network 105.

Detecting a condition to record user device data may include detecting that a trigger event had occurred (block 614). Detecting a trigger event may include, for example, detecting that a parameter associated with user device 110 is above or below a particular threshold, detecting that a parameter associated with a signal sent or received by user device 110 is above or below a particular threshold, detecting that a communication associated with user device 110 has been interrupted or terminated, and/or detecting that user device 110 is in a particular location. A trigger event may include, for example, a bit rate or throughput falling below a particular threshold, a signal strength falling below a particular threshold, a noise level rising above a particular threshold, an error rate rising above a particular threshold, a performance of a processor of user device 110 falling below a particular threshold, detecting that user device 110 is in a particular location, and/or detecting a dropped call or another interruption in a communication session. A trigger event need not be associated with a device or communication failure or a decrease in performance. For example, a trigger event may be associated with an increase in performance or with a problem-free performance during a particular interval. For example, user device 110 may generate a report condition upon detecting a signal strength above a particular threshold or upon determining that no communication sessions were interrupted for a particular number of established communication sessions.

Detecting a condition to record user device data may include receiving a request to record data (block 616). Device report managing system 120 may request that user device 110 generate report record 500. For example, the user of user device 110 may call a customer service center with a problem and to help diagnose a problem, a customer service representative may request information from device report managing system 120. The customer service center may be associated with device report managing system 120 or may be independent of device report managing system 120. If the customer service center is independent of device report managing system 120, the customer service center may contact device report managing system 120 for information associated with user device 120. In response, device report managing system 120 may send a request to user device 110 to collect the requested information. As another example, device report managing system 120 may need to generate a statistics report based on particular conditions, such as conditions associated with a particular make and model of user device 110. Device report managing system 120 may determine that user device 110 is associated with the particular make and model and may send a request to generate device reports in response to the determination. Device report managing system 120 may send a test signal to user device 110 along with the request to generate report record 500, and may instruct user device 110 to record particular parameters associated with the sent test signal.

Returning to FIG. 6A, user device data may be recorded (block 620). For example, report generator 410 may communicate with location identifier 420, device monitor 430, and/or signal monitor 440 to generate report record 500 and store report record 500 in report database 450.

Figure 6C:
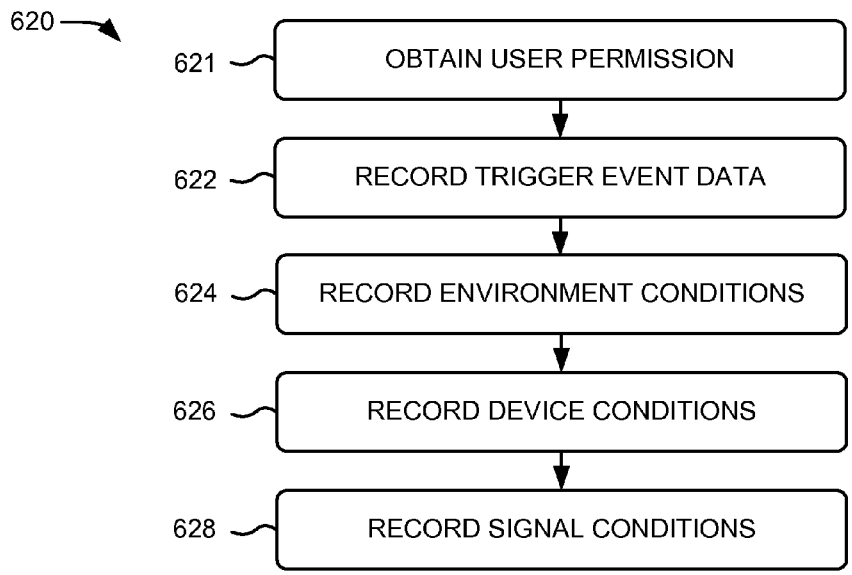
FIG. 6C is a second flow diagram illustrating in more detail part of the process of FIG. 6A according to an implementation described herein.

FIG. 6C illustrates in more detail part of the process of FIG. 6A represented by block 620. Recording user device data may include obtaining user permission (block 621). For example, report generator 410 may prompt a user of user device 110, via user interface 230, for permission to generate report record 500. In one implementation, a user may be prompted for permission once report component 400 has been installed. In another implementation, a user may be prompted for permission each time a report record is generated. In yet another implementation, a user may be prompted to select which parameters may be recorded.

Trigger event data may be recorded (block 622). For example, if the report was generated as a result of a particular trigger (and/or as a result of a request received from device report managing system 120), report generator 410 may store information associated with the trigger event in trigger event field 505 of report record 500.

Environment conditions may be recorded (block 624). For example, report generator 410 may record a time associated with the generated report, a location associated with the generated report (by consulting location identifier 420), and/or neighboring network sites associated with the location associated with the generated report.

Device conditions may be recorded (block 626). For example, report generator 410 may consult device monitor 430 to obtain hardware information associated with user device 110, software information associated with user device 110, network settings associated with user device 110, usage conditions associated with user device 110, a last communication associated with user device 110, and/or other information associated with user device 110.

Signal conditions may be recorded (block 628). For example, report generator 410 may consult signal monitor 440 to obtain signal information associated with a current, or a previous, communication between user device 110 and network 105 such as signal strength, noise level, bit rate, error rate, and/or modulation scheme.

Returning to FIG. 6A, a condition to report user device data may be detected (block 630). For example, report interface 460 may detect a particular condition that has been designated as causing report interface 460 to provide one or more report records 500, or particular information stored in one or more report records 500, to device report managing system 120.

Figure 6D:
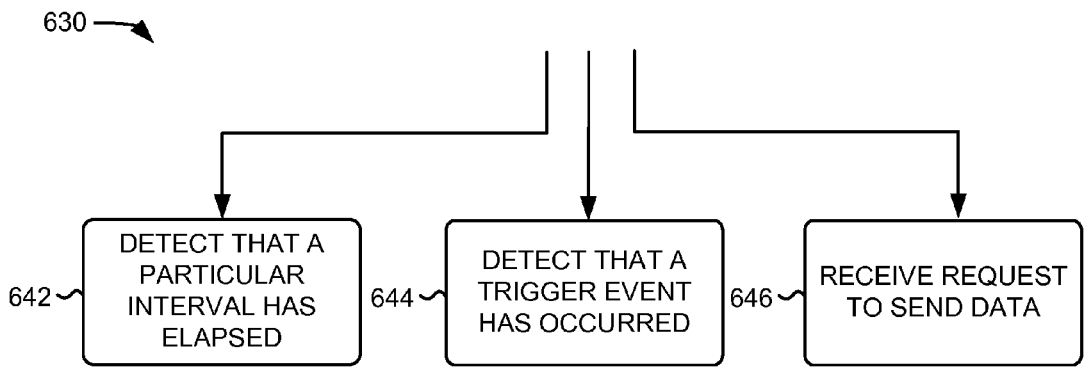
FIG. 6D is a third flow diagram illustrating in more detail part of the process of FIG. 6A according to an implementation described herein.

FIG. 6D illustrates in more detail part of the process of FIG. 6A represented by block 630. Detecting a condition to report user device data may include detecting that a particular interval has elapsed (block 642). For example, report interface 460 may be configured to send report records 500, or particular information stored in report records 500, at particular intervals. In one implementation, the particular intervals may be determined by report component 400. In another implementation, the particular intervals may be determined by device report managing system 120. For example, device report managing system 120 may request that user device 110 provide a streaming report during a diagnosis procedure. The streaming report may continue as user device 110 changes locations or changes parameters associated with user device 110 or associated with a signal between user device 110 and network 105.

Detecting a condition to report user device data may include detecting that a trigger event had occurred (block 644). In one implementation, a particular trigger event to report user device data may be substantially identical to a particular trigger event to send the user device data to device report managing system 120. For example, whenever user device 110 detects a trigger event to generate report record 500, generated report record 500 may be sent to device report managing system 120. In another implementation, a particular trigger event to generate a report record may differ from a particular condition to send the generated report record to device report managing system 120.

For example, report generator 410 may be configured to generate report record 500 when a particular trigger event occurs, and report interface 460 may be configured to send generated report records 500 to device report managing system 120 if the particular trigger event occurs more than a particular number of times within a particular time period. Thus, for example, report generator 410 may be configured to generate report record 500 in response to detecting a packet loss rate higher than a particular threshold and report interface 460 may be configured to send report records 500, generated in response to high packet loss rates, to device report managing system 120 if the packet loss rate exceeds the particular threshold during a particular percentage of communication sessions.

As another example, report generator 410 may be configured to generate report record 500 when a particular trigger event occurs, based on a first threshold, and report interface 460 may be configured to send generated report records 500 to device report managing system 120 if the particular trigger event occurs and is associated with a second threshold. Continuing with the packet loss example, report generator 410 may be configured to generate report record 500 in response to detecting a packet loss rate higher than a first threshold and report interface 460 may be configured to send report records 500, generated in response to high packet loss rates, to device report managing system 120 if the packet loss rate exceeds a second threshold that is higher than the first threshold.

Detecting a condition to report user device data may include receiving a request to send data (block 646). Device report managing system 120 may request that user device 110 provide generated report records 500, or provide particular information stored in generated report records 500. For example, the user of user device 110 may initiate a request for assistance with a problem associated with user device 110 and may call customer service with a problem. In order to help diagnose a problem, a customer service representative may request information from device report managing system 120. In response, device report managing system 120 may send a request to user device 110 to retrieved report records 500 that were previously generated. As another example, device report managing system 120 may need to generate a statistics report based on particular conditions, such as conditions associated with a particular make and model of user device 110. Device report managing system 120 may determine that user device 110 is associated with the particular make and model and may send a request to retrieved report records 500 that were previously generated.

Additionally or alternatively, device report managing system 120 may instruct user device 110 to provide live streaming of report records 500. As report records 500 are generated and sent to device report managing system 120, device report managing system 120 may instruct user device 110 to vary one or more parameters, and user device may generate report records 500 that may reflect the requested parameter variations.

Returning to FIG. 6A, recorded user device data may be sent (block 640). For example, report interface 460 may prepare generated report records 500 into a format compatible with device report managing system 120 and may send the prepared generated report records 500 to report interface 465. In order to avoid charges being applied to the user of user device 110, report records 500 may be sent to a dedicated access point name (APN) set up to receive report records 500 from user devices without applying data charges to the user devices.

Figure 7A:
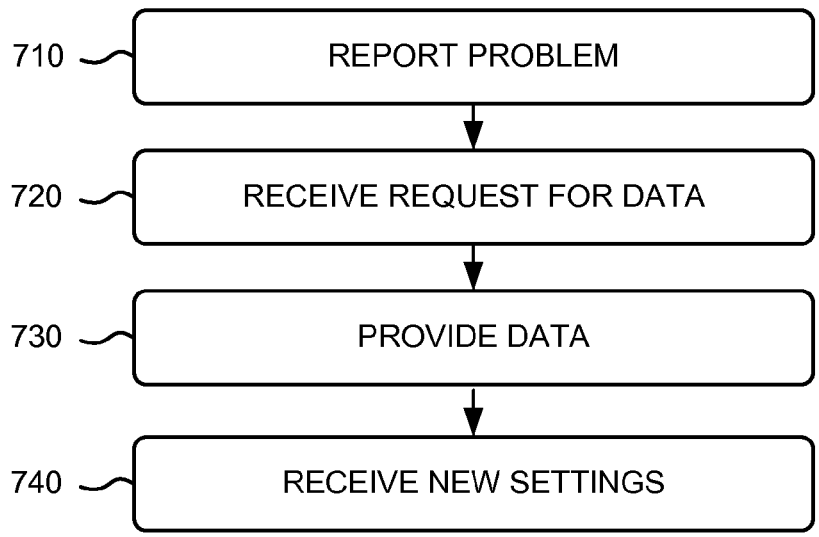
FIG. 7A is a flow diagram illustrating a process of interacting with a device report managing system according to an implementation described herein.

FIG. 7A is a flow diagram illustrating a process of interacting with device report managing system 120 according to an implementation described herein. In one implementation, the process of FIG. 7A may be performed by user device 110. In other implementations, some or all of the process of FIG. 7A may be performed by another device or a group of devices separate from or including user device 110.

The process of FIG. 7A may include reporting a problem (block 710). For example, user device 110 may determine that a particular trigger event to generate a report record has occurred or that a particular trigger event to send generated report records has occurred. As another example, a user of user device 110 may detect a particular problem associated with user device 110, and may request either help from an operator or automated help from device report managing system 120.

A request for data may be received (block 720). For example, device report managing system 120 may request particular information stored in report records 500 generated by user device 110 and report interface 460 of user device 110 may receive the request.

Data may be provided (block 730). For example, in response to receiving the request for data, report interface 460 may access report database 450, retrieve data associated with the requested report records 500, or particular information stored in report records 500, prepare the retrieved data into a format compatible with device report managing system 120, and send the prepared data to device report managing system 120.

New settings may be received (block 740). For example, in response to providing the requested data, device report managing system 120 may determine new settings for user device 110 to address the reported problem, and user device 110 may receive the new settings and apply the new settings.

Figure 7B:
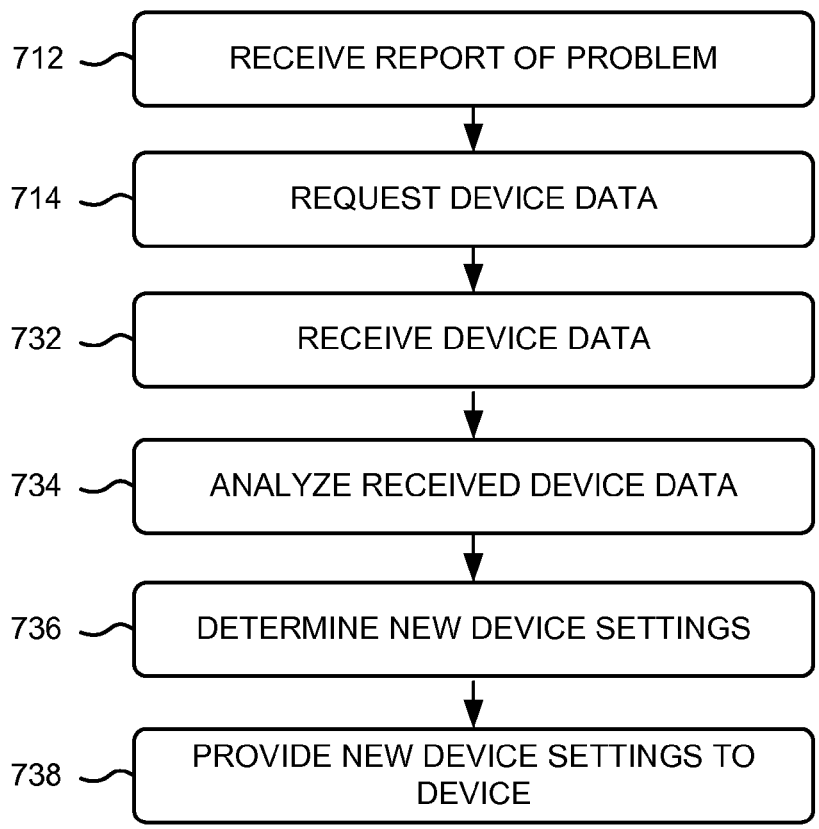
FIG. 7B is a flow diagram illustrating a process of interacting with user equipment according to an implementation described herein.

FIG. 7B is a flow diagram illustrating a process of interacting with user device 110 according to an implementation described herein. In one implementation, the process of FIG. 7B may be performed by device report managing system 120. In other implementations, some or all of the process of FIG. 7B may be performed by another device or a group of devices separate from or including device report managing system 120.

The process of 7A may include receiving a report of a problem (block 712). For example, report interface 465 of device report managing system 120 may receive a report related to a particular problem associated with user device 110. The report may be a response to a particular trigger event or may be initiated by a user requesting either help from an operator or automated help from device report managing system 120.

Device data may be requested (block 714). For example, report interface 465 may request particular data relating to the reported problem. For example, if user device 110 reports a bit rate below a particular threshold, report interface 465 may request device settings associated with user device 110 stored in device data field 520. As another example, a customer service representative may request to retrieve generated report records 500 associated with user device 110, or may request to generate report records 500, in response to a user of user device 110 calling a customer support line with a particular problem associated with user device 110.

Device data may be received (block 732). For example, report interface 465 may receive the requested data from user device 110. Received device data may be analyzed (block 734) and new device settings may be determined (block 736). For example, report analyzer 470 may compare device parameters received from user device 110 with report records, associated with other user devices, stored in report database 480, and/or may access statistics report database 475 to identify statistics associated with the received device parameters that may be used to improve a bit rate of signals sent or received by user device 110. For example, report analyzer 470 may identify report records received from user devices of the same make and model as user device 110, may identify report records which include a reported bit rate above a threshold, and may determine device settings associated with the reported bit rate. The determined new device settings may be provided to a device (block 738). For example, report interface 465 may send the new device settings to user device 110.

Figure 8:
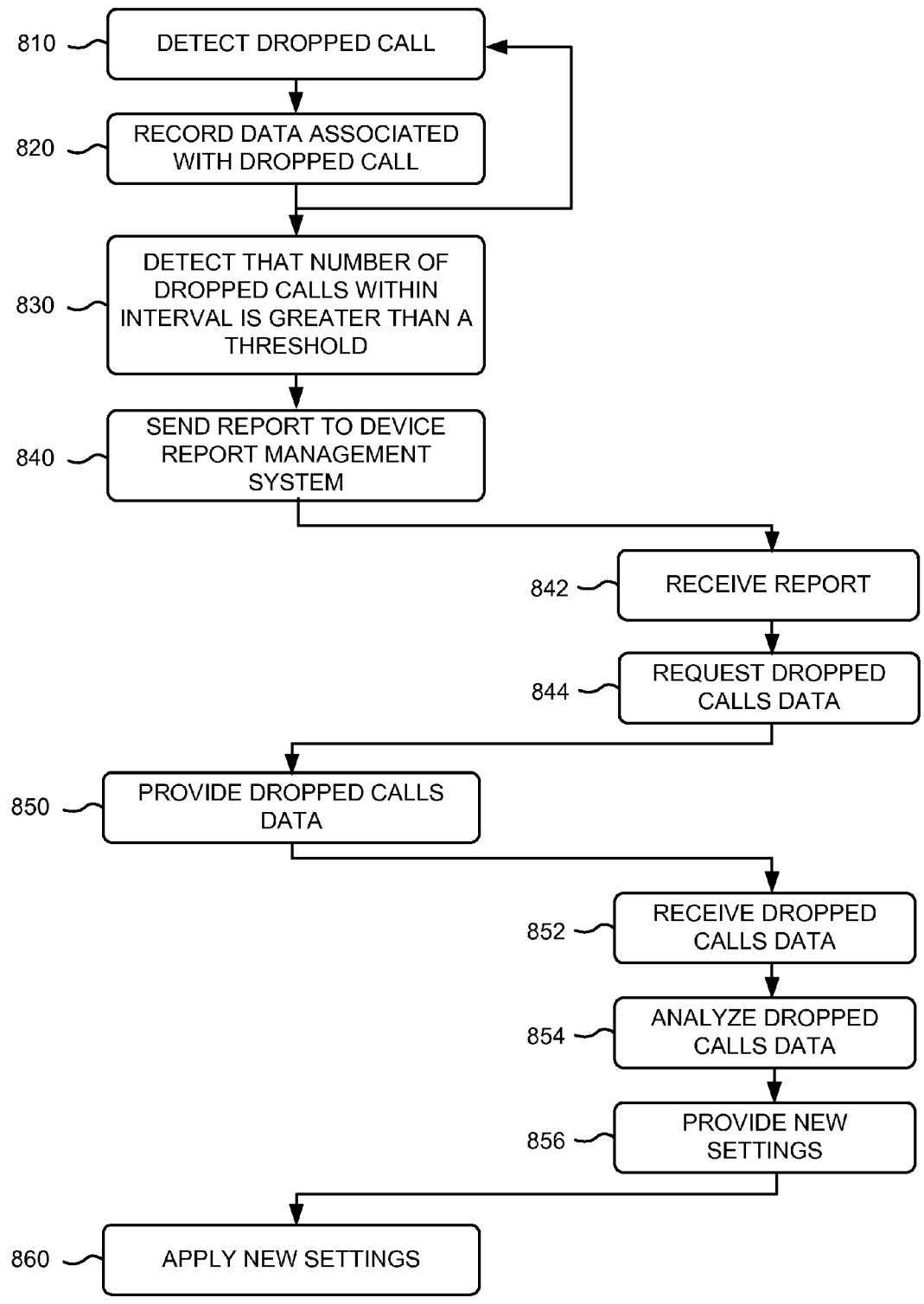
FIG. 8 is a flow diagram illustrating an example of an implementation described herein.

FIG. 8 is a flow diagram illustrating an example of an implementation described herein applied to dropped calls associated with user device 110. In one implementation, part of the process of the example of FIG. 8 may be performed by user device 110 and part of the process of the example of FIG. 8 may be performed by device report managing system 120. In other implementations, some, or all, of the example of FIG. 8 may be performed by another device or a group of devices separate from or including user device 110 and/or device report managing system 120.

The example of FIG. 8 may include detecting a dropped call (block 810). User device 110 may lose connection to network 105 during a voice communication session. Data associated with the dropped call may be recorded (block 820). For example, report generator 410 may detect the dropped call and generate report record 500. Report record 500 may include, for example, a time associated with the dropped call, a location associated with the dropped call, network settings and/or a modulation scheme associated with user device 110, a signal strength associated with the voice communication session, and/or other information associated with user device 110. User device 110 may experience multiple dropped calls within a particular time period.

A detection may be made that the number of dropped calls within an interval is greater than a threshold (block 830) and a report may be sent to a device report managing system in response to the detection (block 840). For example, report interface 460 may be configured to send a report to device report managing system 120 if user device 110 experiences three or more dropped calls within a 24 hour period.

The report from the user device may be received (block 842) and dropped calls data may be requested (block 844). For example, device report managing system 120 may request particular data from report records 500, such as locations associated with the dropped calls, network settings associated with user device 110 during the dropped calls, signal strengths associated with the calls that were dropped, and/or other information included in report records 500. User device 110 may provide the requested data to device report managing system 120 (block 850).

The dropped calls data may be received (block 852) and analyzed (block 854). Report analyzer 470 may compare the dropped calls data with information in statistics report database 475. For example, report analyzer 470 may compare signal parameters and/or device parameters associated with locations of the dropped calls with signal parameters and/or device parameters of other user devices of the same make and model as user device 110, from which the data was received. Report analyzer 470 may determine that network settings and/or a modulation scheme of user device 110 may be adjusted to decrease the likelihood of dropped calls experienced by user device 110, such as, for example, adjusting an acceptable packet loss level, adjusting a framing and compression scheme, and/or adjusting a packet size. Additionally or alternatively, report analyzer 470 may determine that user device 110 may experience stronger signals by connecting to a different base station.

The new settings may be provided to user device 110 (block 856) and user device 110 may apply the new settings (block 860). For example, user device 110 may adjust parameters associated with network settings and or may connect to a different base station.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6A-8, the order of the blocks may be modified in other implementations. Further, non-dependent blocks may be performed in parallel.

Also, certain portions of the implementations may have been described as a "component" that performs one or more functions. The term "component" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   detecting, by a device, a first condition to generate a report associated with the device when a particular value exceeds a first threshold,
   the particular value being a packet loss rate;
   recording, by the device, one or more of environment conditions associated with the device, device conditions associated with the device, or signal conditions associated with the device;
   generating, by the device and after the detecting of the first condition, the report based on the one or more of the environment conditions, the device conditions, or the signal conditions;
   detecting, by the device, a second condition to send the report generated after the detecting of the first condition when the particular value exceeds a second threshold,
   the second threshold being different from the first threshold, and
   the second condition being different from the first condition; and
   sending, by the device and after the detecting of the second condition, the report generated after the detecting of the first condition to a server device.

2. The method of claim 1, further comprising:
   receiving, from the server device, a request to generate another report,
   generate the other report based on the request, and
   transmit the report to the server device.

3. The method of claim 1, further comprising:
   sending a first request for assistance to a customer service center; and
   receiving a second request from the server device to send the report to the server device,
   the second request being associated with the first request for assistance sent to the customer service center.

4. The method of claim 1,
   where the report is based on the environment conditions associated with the device, and
   where the environment conditions associated with the device include one or more of:
   a location associated with the device; or
   information identifying one or more neighboring network sites associated with the device.

5. The method of claim 1,
   where the report is based on the device conditions associated with the device, and
   where the device conditions associated with the device include one or more of:
   information identifying particular hardware associated with the device;
   information identifying particular software installed in the device;
   information identifying network settings associated with the device;
   information identifying usage conditions associated with the device; or
   information about a last communication performed by the device.

6. The method of claim 1,
   where the report is based on the signal conditions associated with the device, and
   where the signal conditions associated with the device include one or more of:
   a signal strength associated with a signal received by the device;
   a noise level associated with the signal received by the device;
   a bit rate associated with the signal received by the device;
   an error rate associated with the signal received by the device; or
   a modulation scheme associated with the signal received by the device and one or more other signals sent or received by the device.

7. The method of claim 1, where one or more of the environment conditions, the device conditions, or the signal conditions includes:
   detecting that a particular interval has elapsed; and collecting the one or more of the environment conditions, the device conditions, or the signal conditions based on detecting that the particular time interval has elapsed.

8. The method of claim 1, where detecting the second condition to send the report includes:
   detecting that the particular value has exceeded the second threshold a particular number of times within a particular period of time.

9. The method of claim 1, further comprising:
   receiving, from the server device, new device settings for the device after sending the report to the server device.

10. A device comprising:
   one or more processors to:
      detect a first condition to generate a report when a particular value exceeds a first threshold,
         the particular value being a packet loss rate,
      identify a location associated with the device,
      record at least one of first parameters associated with the device or second parameters associated with a signal received by the device,
      generate, after the detecting of the first condition, a report based on one or more of the location associated with the device, the first parameters associated with the device, or the second parameters associated with the signal,
      detect a second condition to send the report generated after the detecting of the first condition when the particular value exceeds a second threshold,
         the second threshold being different from the first threshold, and
         the second condition being different from the first condition, and
      send, after the detecting of the second condition, the report generated after the detecting of the first condition to a server device.

11. The device of claim 10, where the one or more processors are further to:
   receive, from the server device, a request to generate another report, and
   transmit the other report to the server device based on the request.

12. The device of claim 10, where the first parameters associated with the device include one or more of:
   information identifying particular hardware associated with the device;
   information identifying particular software installed in the device;
   information identifying network settings associated with the device;
   information identifying usage conditions associated with the device; or
   information about a last communication performed by the device.

13. The device of claim 10, where the second parameters associated with the signal include one or more of:
   a signal strength associated with the signal;
   a noise level associated with the signal;
   a bit rate associated with the signal;
   an error rate associated with the signal; or
   a modulation scheme associated with the signal.

14. The device of claim 10, where, when detecting the second condition, the one or more processors are to:
   detect that the particular value has exceeded the second threshold a particular number of times within a particular period of time.

15. A non-transitory computer-readable medium storing instructions, the instructions comprising:
   one or more instructions that, when executed by one or more processors, cause the one or more processors to:
      detect a trigger event to generate a report associated with a device when a particular value exceeds a first threshold,
         the particular value being a packet loss rate;
      generate the report after detecting that the trigger event has occurred,
         the report including information regarding one or more of:
            environment conditions associated with the device,
            device conditions associated with the device, or
            signal conditions associated with a signal received by the device;
      detect a condition to send the report generated after the detecting of the trigger event when the particular value exceeds a second threshold,
         the second threshold being different from the first threshold, and
         the trigger event being different from the condition; and
      send, to a server device and after the detecting of the condition, the report generated after detecting that the trigger event has occurred.

16. The non-transitory computer-readable medium of claim 15, where the second threshold is higher than the first threshold.

* * * * *